United States Patent
Hodur et al.

(10) Patent No.: US 6,520,637 B2
(45) Date of Patent: *Feb. 18, 2003

(54) LOW-MASS OPHTHALMIC LENS

(75) Inventors: Neil R. Hodur, Tinley Park, IL (US); Patrick J. Caroline, Lake Oswego, OR (US)

(73) Assignee: Art Optical Contact Lens, Inc., Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/005,014

(22) Filed: Dec. 4, 2001

(65) Prior Publication Data

US 2002/0060776 A1 May 23, 2002

Related U.S. Application Data

(63) Continuation of application No. 09/377,985, filed on Aug. 20, 1999, now Pat. No. 6,325,509.

(51) Int. Cl.$^7$ ................................................. G02C 7/04
(52) U.S. Cl. .................................................. 351/160 R
(58) Field of Search .................... 351/160 R, 160 H, 351/161, 162, 177

(56) References Cited

U.S. PATENT DOCUMENTS

| | | |
|---|---|---|
| 4,074,469 A | 2/1978 | Nuchman et al. |
| 4,554,115 A | 11/1985 | Neefe |
| 4,561,737 A | 12/1985 | Bourset et al. |
| 4,640,594 A | 2/1987 | Berger |
| 4,640,595 A | 2/1987 | Volk |
| 4,909,621 A | 3/1990 | Evans |
| 5,125,729 A | 6/1992 | Mercure |
| 5,517,260 A | 5/1996 | Glady et al. |
| 5,526,071 A | 6/1996 | Seidner et al. |
| 5,619,289 A | 4/1997 | Seidner et al. |
| 5,623,323 A | 4/1997 | Johnson et al. |
| 5,715,031 A | 2/1998 | Roffman et al. |
| 5,790,231 A | 8/1998 | Mercier |
| 6,325,509 B1 * | 12/2001 | Hodur et al. ........... 351/160 R |

* cited by examiner

*Primary Examiner*—Scott J. Sugarman
(74) *Attorney, Agent, or Firm*—Price, Heneveld, Cooper, DeWitt & Litton

(57) ABSTRACT

The disclosed ophthalmic lens includes a posterior surface and an anterior surface having a spherical central optical correction zone, an aspheric intermediate zone, and a peripheral zone. The intermediate and peripheral zones are not used for optical correction. The posterior surface includes a central optical zone, an intermediate zone, and a peripheral zone. The central optical zone of the anterior surface has a larger diameter than the central optical zone of the posterior surface. Similarly, the intermediate zone of the anterior surface has a larger diameter than the intermediate zone of the posterior surface. The inventive construction is particularly beneficial when applied to a rigid contact lens, particularly rigid contact lenses made using a high DK material.

16 Claims, 1 Drawing Sheet

LOW-MASS OPHTHALMIC LENS

CROSS-REFERENCE TO RELATED APPLICATION

This application is a continuation of U.S. patent application Ser. No. 09/377,985 filed Aug. 20, 1999, by Neil R. Hodur et al. entitled "LOW-MASS OPHTHALMIC LENS," U.S. Pat. No. 6,325,509 the entire disclosure of which is incorporated herein by reference.

BACKGROUND OF THE INVENTION

The present invention generally pertains to an ophthalmic lens. More particularly, the present invention relates to a contact lens, and even more particularly relates to a rigid gas-permeable contact lens.

When contact lenses were first commercialized, they were made of a rigid material, such as polymethylmethacrylate (PMMA). As shown in FIG. 1, such contact lenses had a posterior surface 10 including a central optical zone 12 and one or more peripheral zones 14, 16. Optical zone 12 on posterior surface 10 was defined by a generally spherical surface having a radius of curvature corresponding to a measured base curve of the cornea upon which the contact lens was to be worn. The peripheral zones (14, 16) were also defined by spherical curves and were typically flatter than the curve defining central optical zone 12. The peripheral zones were dimensioned to closely fit the outer area of the cornea. The anterior surface 20 of these early contact lenses typically had one to three zones, including a front central optical correction zone 22, an optional intermediate zone 24 and an optional peripheral lenticular zone 26. Both of these anterior surface zones were defined by spherical curves, with the radius of curvature of anterior central optical zone 22 being selected so as to provide the appropriate optical power for correction of the patient's hyperopic, myopic, and/or astigmatic condition. The radius of peripheral lenticular zone 26 on anterior surface 20 was selected so as to provide a transition from central optical zone 22 to an edge 17 of the contact lens, which typically had a thickness of, for example, 0.125 mm. The transitions 25 between zones on anterior surface 20 generally aligned with transitions (18, 28) between zones on posterior surface 10.

In the late 1960's, contact lenses were modified somewhat by removing the discrete junctions (18) between the zones by joining the spherical curves with tangential transitions (28). Subsequently, the posterior surfaces of the contact lens were made aspheric so as to more closely fit the anterior surface of the cornea, which is also aspheric.

While soft contact lenses were developed subsequent to rigid lenses and are currently in wide use, such soft contact lenses cannot be used as effectively to correct the vision of individuals having more severe optical impairment. Thus, there remains a large market for rigid and rigid gas-permeable (RGP) lenses.

Individuals who wear rigid lenses may experience discomfort, which is typically caused by the sensation of having a rigid foreign object with a significant amount of mass on the individual's eye. While consideration has been given to reducing the thickness of the rigid contact lenses so as to reduce their mass and increase oxygen permeability, thin rigid contact lenses have not been commercially feasible due to the weakening of the contact lens structure and the resultant increased likelihood of breakage, warpage, and flexure. Flexure in a rigid contact lens is undesirable because the lens flexes each time the patient blinks thereby resulting in variable vision correction.

Thin lens designs gained worldwide popularity with the introduction of Syntex's Polycon I material in 1979. That material, now coined a silicon/acrylate, had an oxygen permeability (DK) of $5\times10^{-11}$. The lenses were available in inventory designs of 9.5/8.4, 9.0/7.8, and 8.5/7.3 (outer diameter/optical zone). The 9.5-mm diameter lens incorporated a specific anterior lenticular design and a standard spherical tri-curve posterior design. The lens was fitted approximately 1.00 to 1.50 D flatter than "K" to permit lid/lens attachment in unobstructed upward lens movement. "K" is considered to be the flattest central curve of the cornea.

The Polycon I lens was eventually phased out and replaced with the Polycon II material, which has a DK=12× $10^{-11}$. Past attempts to produce thin RGP lens designs in moderate to high DK materials have met with only limited success. Material brittleness, warpage, and base curve instability as well as visual interference caused by flexure have prevented the designs from enjoying the success of the low DK Polycon II.

Therefore, a need has existed in the rigid contact lens market for a contact lens having a lower mass while retaining structural rigidity and strength.

SUMMARY OF THE INVENTION

Accordingly, it is an aspect of the present invention to solve the above problems by providing a low-mass rigid contact lens that has the same overall rigidity and strength as a conventional rigid contact lens. It is another aspect of the present invention to provide a rigid contact lens having approximately 50 percent less mass than a conventional rigid contact lens. It is an additional aspect of the present invention to provide a rigid contact lens that is much thinner than the conventional rigid contact lens and thereby provides for additional oxygen transmission through the lens. To achieve these and other aspects and advantages, an ophthalmic lens according to the present invention comprises a posterior surface and an anterior surface, where the anterior surface has a spherical central optical correction zone, an aspheric intermediate zone, and an aspheric peripheral zone. The aspheric intermediate and peripheral zones are not used for optical correction, while the central optical correction zone is used for providing correction at a single focal length.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

As discussed above, the present invention pertains to an ophthalmic lens, and preferably to rigid and RGP contact lenses. While the invention is described below with reference to RGP lenses, the invention is more broadly applicable to any ophthalmic lens. As used and described herein, an "ophthalmic lens" is any lens pertaining to the eye, which includes, but is not limited to, spectacle lenses, intraocular lenses, contact lenses, and the cornea itself.

Figure 1:
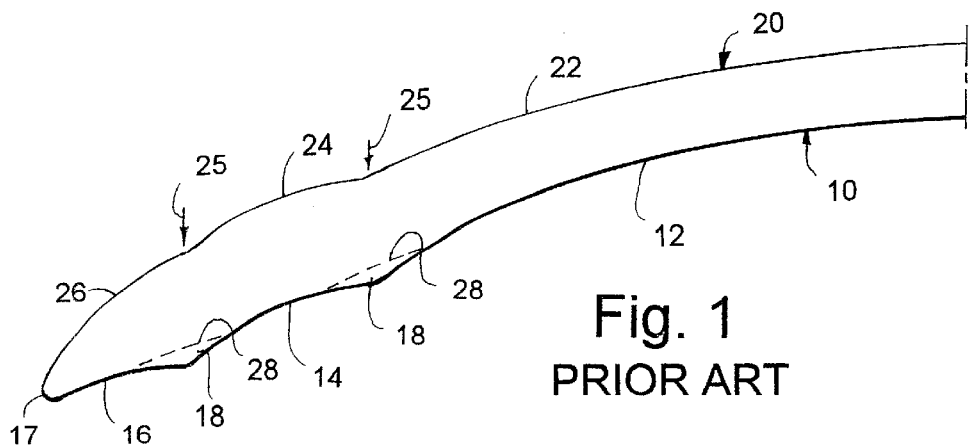
FIG. 1 is a cross-sectional view of a portion of a conventional rigid contact lens.
Figure 2:
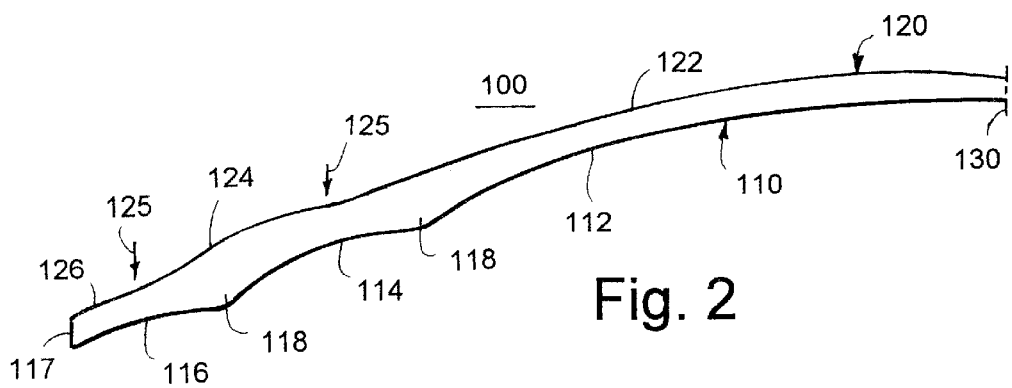
FIG. 2 is a cross-sectional view of a portion of a contact lens constructed in accordance with the present invention.

A contact lens 100 constructed in accordance with the present invention is shown in FIG. 2. As illustrated, contact lens 100 includes a posterior surface 110 and an anterior surface 120. Anterior surface 120 has a spherical central optical correction zone 122, an aspheric intermediate zone 124, and a peripheral zone 126. Zones 122, 124, and 126 are preferably seamlessly transitioned in the transition regions referenced with arrows 125. As further described below, peripheral zone 126 is also preferably aspheric.

Posterior surface 110 of contact lens 100 includes a central optical zone 112, an intermediate zone 114, and a peripheral zone 116. As further described below, the transitions 125 between zones on the anterior surface 120 are offset from transitions 118 of posterior surface 110 so as to be approximately halfway between transitions 118. Thus, central optical zone 122 of anterior surface 120 has a larger diameter than central optical zone 112 of posterior surface 110, and intermediate zone 124 of anterior surface 120 has a larger diameter than intermediate zone 114 of posterior surface 110.

The posterior surface of contact lens 100 is known as the fitting surface because it must align with the topography of the anterior surface of the cornea, resting on the pre-corneal tear layer, yet provide an adequate amount of tear to circulate underneath the lens to provide for proper corneal physiology and cooling as well as ridding of waste products from metabolism. The anterior surface is known as the power or optical surface because it is generally created to provide the necessary blending of light to satisfy the patient's visual needs. The inventive contact lens was constructed to be thin, yet not flex on the corneal surface. The inventive contact lens utilizes a new approach to the design of such contact lenses insofar as it utilizes aspheric curves on the anterior surface to control the thickness and geometric form of a contact lens. The posterior surface of contact lens 100 can be spherical or aspherical, but zones 24 and 26 utilize continuous aspherical curves to control the form of the lens, not the optics. The aspheric curves on anterior surface 120 are not optical in nature. The optics of the lens is through the spherical center optical zones 110 and 120. This allows for clean optics at a distance.

Incorporating this new design approach with high DK materials has resulted in a thin RGP lens having approximately 48 percent less mass than prior RGP lenses, with a firm optical portion that will resist flexure. While this design approach utilizes front surface aspherics to maintain a controlled thickness, it also provides for the required structural integrity in resistance to flexure by utilizing staggered transition zones on the anterior and posterior surfaces. Specifically, by locating the transitions 125 between zones on anterior surface 120, such that they are halfway between transitions 118 on posterior surface 110, a "dome" effect is created. The dome effect ensures uniform strength throughout the lens and thus allows one curve to support another. Absent this staggering of transition zones, a thin contact lens would not exhibit the dome effect and would not have sufficient structural rigidity to be resistant to flexure, breakage, or warpage unless the thickness was increased.

While the idea of using aspheric surfaces on either the posterior or anterior surfaces is not by itself novel, lenses that utilized aspheric anterior surfaces are multi-focal lenses that utilize the aspheric surface for continuous correction for all distances from reading to infinity. Such aspheric curves, however, were not previously utilized on the anterior surface of a contact lens providing a single zone of optical correction (i.e., lenses designed to correct either hyperopia or myopia), and particularly were not used only in non-optical correcting zones of the contact lens. As explained further below, the inventive contact lens utilizes aspheric anterior curves that may have eccentricities opposite the aspheric curves used in multi-faced designs.

Contact lens 100 was preferably made of a homogenous rigid gas-permeable material. While contact lens 100 may be made of any such material, lens 100 is preferably made of a material having oxygen permeability (DK) of at least $28 \times 10^{-11}$. As used herein, "oxygen permeability" (DK) of a lens material is the rate at which oxygen will pass through a material. Oxygen permeability is conveniently expressed in units of barrers, where "barrer" is defined as $[(cm^3 \text{ oxygen})(mm)/(cm^2)(sec)(mm \text{ Hg})] \times 10^{10}$. Examples of preferred materials include Boston EO™ from Polymer Technology of Rochester, N.Y. (DK=$44 \times 10^{-11}$) and Fluoroperm® 30 and HDS™ from Paragon Optical Company of Tempe, Ariz. The most preferred material being Boston ES® from Polymer Technology (DK=$28 \times 10_{31\ 7}$).

Central optical zone 112 on posterior surface 110 is defined by a base curve. As will be apparent to those skilled in the art, the curve, although two-dimensional, may be used to define a surface of rotation, since the contact lens is symmetric about its central axis 130. The base curve defining central optical zone 112 corresponds to the base curve measured on the anterior surface of the cornea. Central optical zone 112 may be spherical or aspherical. Intermediate zone 114 on posterior surface 110 is defined by a fitting curve, which is flatter than the base curve. The radius $r_{P2}$ of the fitting curve is determined as a function of the base curve ($r_{base}$) as explained in more detail below. Peripheral zone 116 on posterior surface 110 has a radius $r_{p3}$ that is related to and flatter than the fitting curve. The degree to which the fitting curve is flatter than the base curve is dependent upon the diameter of the lens. Table 1 below provides an example of the relationships between the base curve, fitting curve, vault curve, and diameter of lens for lenses of four different diameters.

TABLE 1

| DIAMETER OF LENS, $\gamma T$ | FITTING CURVE, $\Gamma P2$ | VAULT CURVE, $\Gamma P3$ |
| --- | --- | --- |
| 8.5 mm | base curve($\Gamma$base) + 1.00 mm | fitting curve($\Gamma$P2) + 1.50 mm |
| 9.0 mm | base curve($\Gamma$base) + 1.10 mm | fitting curve($\Gamma$P2) + 1.50 mm |
| 9.2 mm | base curve($\Gamma$base) + 1.20 mm | fitting curve($\Gamma$P2) + 1.50 mm |
| 9.5 mm | base curve($\Gamma$base) + 1.20 mm | fitting curve($\Gamma$P2) + 1.00 mm |

Figure 3:
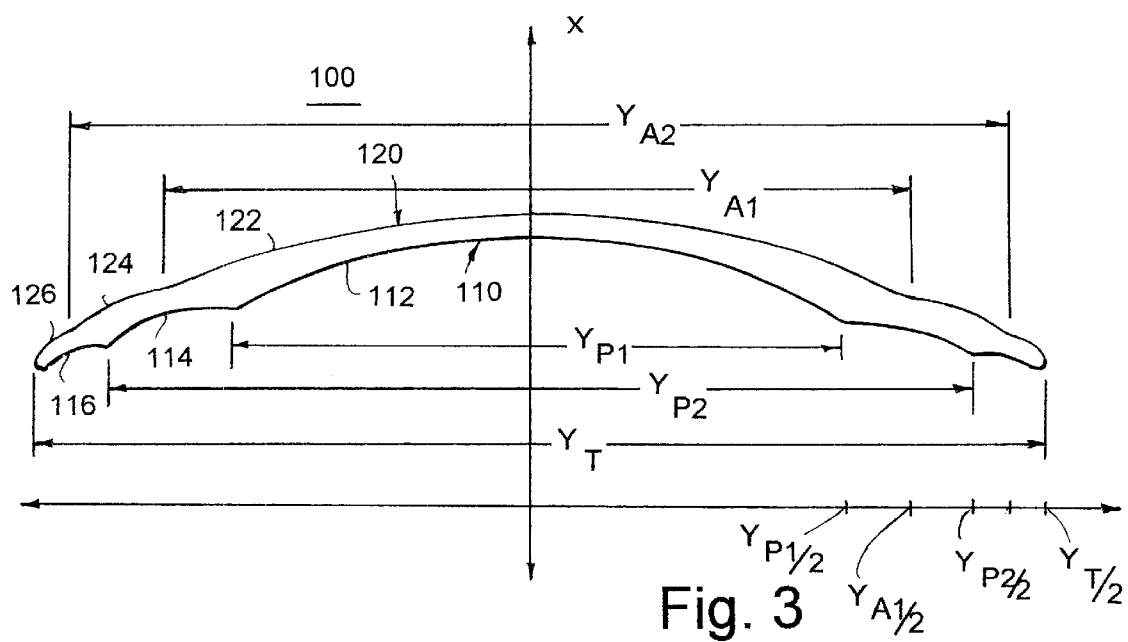
FIG. 3 is another cross-sectional view of a contact lens constructed in accordance with the present invention.

The diameters of the optical zones on the posterior surface 110 are determined as a function of the diameter of the lens. As shown in FIG. 3, the central optical zone 112 has a diameter of $Y_{P1}$ and intermediate zone 114 is annular in shape and has an inner diameter of $Y_{P1}$ and an outer diameter of $Y_{P2}$. Peripheral zone 116 is also annular in shape and has an inner diameter corresponding to the outer diameter of zone 114 (i.e., $Y_{P2}$), and an outer diameter corresponding to the total diameter of the lens $Y_T$. On anterior surface 120, central optical zone 122 has a diameter of $Y_{A1}$. Intermediate zone 124 is annular in shape and has an inner diameter of $Y_{A1}$ and an outer diameter of $Y_{A2}$. Peripheral zone 126 is also annular in shape and has an inner diameter of $Y_{A2}$ and an outer diameter corresponding to the total diameter $Y_T$ of the lens. Table 2 below defines these diameters for each of the four total diameters $Y_T$ listed in Table 1 above.

TABLE 2

| Diameter of Lens, $\gamma T$ | First Posterior Transition, $\gamma P1$ | Second Posterior Transition, $\gamma P2$ | First Anterior Transition, $\gamma A1$ | Second Anterior Junction, $\gamma A2$ |
|---|---|---|---|---|
| 8.5 mm | 7.3 mm | 8.1 mm | 7.7 mm | 8.3 mm |
| 9.0 mm | 7.8 mm | 8.4 mm | 8.1 mm | 8.6 mm |
| 9.2 mm | 8.0 mm | 8.8 mm | 8.4 mm | 9.0 mm |
| 9.5 mm | 8.3 mm | 9.1 mm | 8.7 mm | 9.3 mm |

As apparent from viewing FIG. 3 and Table 2 above, the transitions 125 are midway between transitions 118 on posterior surface 110. Again, this provides the dome effect mentioned above, which increases the structural rigidity of the lens.

The three curves defining the three zones on anterior surface 120 are designed to minimize the overall thickness of the lens, allowing control of the lens thickness from edge to edge. The curve defining central optical zone 122 is configured to obtain the optics necessary to provide the prescription needs of the lens. The curve defining intermediate zone 124, also referred to as the lenticular control curve, is aspheric in nature and is mathematically determined to keep the lens at substantially a constant thickness. The third anterior curve, referred to as the edge control curve, defies peripheral zone 126. The edge control curve is designed to provide an edge thickness of 0.125 mm after finishing of the lens. The 0.125 mm thickness at the edge is generally known as an optimum edge thickness for the contact lens.

Given that the base curve radius $r_{base}$ and the lens diameter $Y_T$ determine the radius of curvatures of each of the curves defining the optical zones on posterior surface 110 and given that the diameter of the lens $Y_T$ determines the location of the transitions of these posterior zones, an inventory of lens blanks may be kept in stock by a lens manufacturer that have different base curves for the different diameter lenses without regard to the optical power that is subsequently provided by turning and polishing the anterior surface of the lens blank typically with a computerized numerically controlled (CNC) lathe. Thus, the inventive contact lens design enables a relatively low number of different types of lens blanks to be kept in inventory. The lens blanks may be preconstructed as plano lenses having no optical power or not be pre-cut. Thus, the anterior surface, particularly the surface defining the central optical zone, has a radius of curvature that corresponds closely to the base curve of the lens blank. The manner in which such lens blanks are then turned to provide the requisite optical power per the patient's prescription is described below.

The optical power Fv' (i.e., dioptrics) of the lens was determined from the following formulas:

$$Fv' = \frac{F_1}{1 - cF_1} + F_2 \quad (1)$$

$$F_1 = \frac{n_{lens} - n_{air}}{r_{A1}} \quad (2)$$

$$F_2 = \frac{n_{air} - n_{lens}}{r_{base}} \quad (3)$$

$$c = \frac{x}{n_{lens}} \quad (4)$$

Where $r_{base}$ is the base curve radius defining central optical zone 112 of posterior surface 110, $r_{A1}$ is the radius of curvature of the curve that defines central optical zone 122 of anterior surface 120 so as to impart the needed optical power, x is the thickness in millimeters of the lens at a particular y value which is the distance from the central optical axis of the lens, $n_{lens}$ is the refractive index of the lens material, $n_{air}$ is the refractive index of air, $F_1$ is the refractive power of an anterior optical zone surface 122, F2 is the refractive power of posterior optical zone surface 122, and c is a convergence factor. The lens thickness is taken into account by measuring various Sagitta (s) for various values of y, while ensuring that the thickness x does not vary by more than a target curve depth differential of 0.08 mm. The target curve depth differential may vary with different lens materials having different degrees of structural rigidity. For example, if a material having a greater structural rigidity were used, the target curve depth differential could be lowered to 0.04 mm for instance. The Sagitta are determined by the equation below:

$$s = r - \sqrt{r^2 - y^2} \quad (5)$$

The best conic-section to create the necessary on the front to give the desired thickness may be derived from eccentricity values, which may be expressed as an e value or a p value. The e and p values are derived from the equations below:

$$p = \frac{2rx - y^2}{x^2} \quad (6)$$

$$p = 1 - e^2 \quad (7)$$

The p represents the amount of asphericity based upon a conical section, where p>1.00 is defined as a prolate ellipse, 0<p<1 is defined as an oblate ellipse, p=0 is defined as a parabola, and p<0 is defined as a hyperbola. The e value is the eccentricity of the curve or the amount it differs from a spherical surface, where e=0 defines a sphere, 0<e<1 defined an ellipse, e=1 defines a parabola, and e>1 defines a hyperbola.

To illustrate how the mathematics above operate, an example is provided below for a contact lens having a total diameter $Y_T$ of 9.2 mm, where the optical power is −1.00 diopter and the base curve is set at 7.34. These values would be obtained from the optometrist or ophthalmologist writing the prescription for the patient.

Using Table 1 above, the radius of curvatures $r_{p2}$ and $r_{p3}$ of the curves defining intermediate zone 114 and peripheral zone 116 may be determined. Specifically, for a 9.2 mm lens having a $r_{base}$=7.34 mm base curve, the radius of curvature $r_{p2}$ of the fitting curve defining intermediate zone 114 is 8.54 mm (7.34=1.2) and the vaulting curve defining peripheral zone 116 has a radius $r_{p3}$=10.04 mm (8.54=1.5). We also know using Table 2 that the diameter $Y_{p1}$ of optical zone 112 on posterior surface 110 is 8.0 mm, the intermediate optical zone outside diameter $Y_{p2}$ is 8.8 mm, and the outer diameter $Y_{p3}$ of peripheral zone 116 is 9.2 mm. We also know that the diameter $Y_{A1}$ of central optical zone 122 on anterior surface 120 is 8.4 mm, the intermediate zone 124 has an outside diameter $Y_{A2}$ of 9.0 mm, and peripheral zone 126 has an outside diameter $Y_{A2}$ of 9.2 mm. We also know that the refractive index of air $n_{air}$ is 1.00, and the refractive index of the lens material $n_{lens}$ is 1.45 (for Boston ES® material). Insofar as we know the base curvature $r_{base}$ is 7.34 mm, we can compute the posterior surface optical power $F_2$ using Equation 3 above. The optical power of this surface is $F_2=-61.31$. Because the starting lens is a lens blank having plano power (i.e., $F_v'=0$), by setting a target thickness x for the center of the lens at 0.08 mm, we can determine the anterior surface optical power $F_1$ using Equation 1 above. Then, using Equation 2, we can use this optical power to solve for the initial radius $r_{A1}$ of the anterior surface in the central optical zone. Using this approach, we can thus determine that the radius $r_{A1}$ is equal to 7.37 mm. The next step is to determine the Sagitta $S_1$ using radius $r_{A1}$ at a y value of 4.0, which corresponds to the first junction point $Y_{p1}$ on the posterior surface. This Sagitta value is computed using Equation 5 above to arrive at a value of $S_1=1.18$ in this particular example.

Next, we determine the Sagitta $S_2$ at a value y=4.4 (corresponding to $Y_{p2}$) on the fitting curve 114, which has a radius of 8.54 mm. Again, using Equation 5, we find that $S_2$ is equal to 1.22 at y=4.4. We use this same Sagitta $S_2$ at y=4.2 (corresponding to $Y_{A1}$) to solve for a radius $r_{A2}$ using Equation 5. This gives us a radius of curvature of $r_{A2}=7.84$ mm (for piano power). Using a similar approach, the radius of curvature $r_{A3}$ of peripheral zone 126 may be found to be 8.65 mm.

For a lens requiring an optical power of −1.00 diopters ($F_v'=1.00$), one can then determine the curve profiles required to define the three zones on anterior surface 120 (the surfaces on the posterior surface 110 remain the same). Because the curvature of zone 112 of posterior surface 110 does not change, the optical power $F_2$ of this surface remains equal to −61.31. Thus, using a value Fv'=−1.00, $F_2=-61.31$, a value $n_{lens}=1.45$, and a value x=0.08 mm, we can compute the refractive power $F_1$ of anterior surface zone 122 that is required using Equation 1 above. Using this equation, we find that $F_1$ is equal to 60.09. Then, using Equation 2, we compute the required radius of curvature $r_{A1}'$, which is equal to 7.48 mm. Using $r_{A1}'$, we compute a Sagitta $S_3$ at y=4.2 (corresponding to $Y_{A1}$), which yields a value of 1.29. We then compute a value $d_1$ by determining the difference between the radius of curvature $r_{A1}'$ of the central optical zone 122, which provides in combination with zone 112 the required −1.00 diopter optical power, and the radius of curvature $r_{A2}$ of the initial intermediate zone 124 of the lens blank. This yields a value $d_1=0.36$ (7.84–7.48). We then obtain a value x at y=4.2 by subtracting the computed $d_1$ value from the $S_3$ value, which yields x=0.93. Using x=0.93 mm, r=$r_{A1}'$=7.48 mm, and y=4.2 mm, the p value at y=4.2 may be computed using Equation 6 above, which yields a value of p=−4.31. Using Equation 7, the eccentricity value may be computed as e=2.30. The eccentricity value may thus be computed for each point along the curve defining zone 124 using $r_{A1}'$=7.48 mm and $d_1$=0.36 while recomputing a new Sagitta at each y value and using that new Sagitta to compute a new x value to plug into Equations 6 and 7. This sets the front and back curve differential to a 0.08 mm thickness value.

Next, a second value $d_2$ may be computed by determining the difference between the front surface central curve radius $r_{A1}'$ and the initial radius of curvature $r_{A3}$. This yields a value of $d_2$=1.17 (8.65–7.48). A Sagitta $S_4$ may be obtained at y=4.5 on anterior surface zone 126, which yields a Sagitta value of $S_4$=1.51. We can then subtract the $d_2$ value from this Sagitta $S_4$ to obtain an x value of 0.34 mm. The above Sagitta S4 is obtained using a radius of curvature of 7.48 mm at y=4.5 (corresponding to $Y_{A2}$). Then using a value r=7.48 mm, x 0.34 mm, and y=4.5 mm, the p value (at y=4.5) can be computed using Equation 6 above, which yields a value of −131.17 for this particular example. The eccentricity value of e is equal to 11.50. This sets the front and back curve differential to a 0.08 mm thickness value. Again, the eccentricity values for each point along the curve defining zone 126 may be determined in this manner.

As will be appreciated by those skilled in the art, other dioptric powers may be obtained using the same lens blank. The surfaces may thus be defined for such lenses by setting $F_v'$ equal to the desired dioptric power and running through the equations as performed in the above example. For example, for a lens requiring an optical power of −7.00 diopters ($F_v'=-7.00$) and having the same size (9.2 mm) and the same base curve (7.34 mm), one can use the same lens blank as the lens described above having −1.00 dioptric power. One can then determine the curve profiles required to define the three zones on anterior surface 120 (the surfaces on the posterior surface 110 remain the same). Because the curvature of zone 112 of posterior surface 110 does not change, the optical power $F_2$ of this surface remains equal to −61.31. Thus, using $F_v'=-7.00$, $F_2=-61.31$, $n_{lens}=1.45$, and x=0.08 mm, we can computer the focal power $F_1$ of anterior surface 122 that is required using Equation 1 above. Using this equation, we find that $F_1$ is equal to 54.13. Then, using Equation 2, we compute that $r_{A1}'$ is equal to 8.31 mm. Using $r_{A1}'$, we compute a Sagitta at y=4.2, which yields a value of 1.14. We then compute a value $d_1$ by determining the difference between the radius of curvature $r_{A1}'$ of the central optical zone 122 and the radius of curvature $r_{A2}$ of the initial intermediate zone 124 of the lens blank. This yields a value $d_1$ =0.47 (8.31–7.84). We then obtain our value x at 4.2 by subtracting the computed $d_1$ value from the s value of 1.14, which yields x=0.67. Using x=0.67 mm, r=$r_{A1}$=8.31 mm, and y=4.2 mm, the p value at y=4.2 may be computed using Equation 6 above, which yields a value of p=−14.49 at y=4.2. Using Equation 7, the eccentricity value may be computed as e=3.94. This sets the front and back curve differential to a 0.08 mm thickness value.

Next, a second $d_2$ value may be computed by determining the difference between the front surface central curve radius $r_{A1}'$ and the initial radius of curvature $r_{A3}$. This yields a value of $d_2$=0.34 (8.65–8.31). A Sagitta may be obtained at y=4.5 on anterior surface zone 126, which yields a Sagitta value of 1.32. We can then subtract the $d_2$ value from this Sagitta value to obtain an x value of 0.98 mm. The above Sagitta value is obtained using a radius of curvature of 8.31 at y=4.5. Then using a value r=8.31 mm, x=0.98 mm, and y=4.5 mm, the p value can be computed using Equation 6 above, which yields a value of −4.13 at y=4.5 for this particular example. The eccentricity value of e is equal to 2.26. This sets the front and back curve differential to a 0.08 mm thickness value.

While the above invention has been described with respect to rigid contact lenses, it will be appreciated by those skilled in the art that the inventive concepts may also be applied to other ophthalmic lenses, such as intraocular lenses, spectacle lenses, and soft contact lenses. Additionally, the inventive concepts described above may be employed in constructing other optical lenses, where the total thickness is to be controlled. Further, this technology can be applied to laser refractive surgery, where the cornea is ablated to reshape the cornea and thereby provide optical correction. By reshaping the peripheral cornea as an aspheric surface rather than a spherical surface (as is presently performed), less of the cornea may need to be ablated while still providing the necessary optical correction.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. An ophthalmic lens comprising a posterior surface and an anterior surface, said anterior surface having a spherical central optical correction zone, an aspheric intermediate zone, and a peripheral zone, wherein said intermediate and peripheral zones are not used for optical correction.

2. An ophthalmic lens comprising a posterior surface and an anterior surface, wherein said anterior surface having a central optical correction zone, an intermediate zone, and a peripheral zone, wherein said posterior surface includes a central optical zone, an intermediate zone, and a peripheral zone, and wherein the central optical zone of said anterior surface has a different outer diameter than the central optical zone of said posterior surface.

3. The ophthalmic lens as defined in claim 2, wherein said intermediate and peripheral zones of said anterior surface are not used for optical correction.

4. The ophthalmic lens as defined in claim 2, wherein the intermediate zone of said anterior surface has a different outer diameter than the intermediate zone of said posterior surface.

5. The ophthalmic lens as defined in claim 4, wherein the intermediate zone of said anterior surface has a larger outer diameter than the intermediate zone of said posterior surface.

6. The ophthalmic lens as defined in claim 2, wherein the intermediate zone of said anterior surface has a different outer diameter than the intermediate zone of said posterior surface.

7. The ophthalmic lens as defined in claim 6, wherein the intermediate zone of said anterior surface has a larger outer diameter than the intermediate zone of said posterior surface.

8. The ophthalmic lens as defined in claim 2, wherein the central optical zone of said anterior surface has a larger outer diameter than the central optical zone of said posterior surface.

9. The ophthalmic lens as defined in claim 2, wherein an eccentricity value (e) of a curve defining said anterior intermediate zone increases with increasing distance from the central axis of the lens.

10. The ophthalmic lens as defined in claim 2, wherein said lens is made of a homogeneous material.

11. The ophthalmic lens as defined in claim 2, wherein said lens is made of a rigid gas permeable material.

12. An ophthalmic lens comprising:

a posterior surface having a central optical zone, an intermediate zone, and a peripheral zone, each zone separated by a transition; and an anterior surface having a central optical correction zone, an intermediate zone, and a peripheral zone, each zone separated by a transition, wherein the transitions between zones of said anterior surface are positioned between transitions between zones of said posterior surface.

13. The ophthalmic lens of claim 12, wherein the transitions between zones of said anterior surface are positioned midway between transitions between zones of said posterior surface.

14. The ophthalmic lens of claim 12, wherein the transition from the central zone to the intermediate zone of said anterior surface is between the transition from the central zone to the intermediate zone of said posterior surface and the transition from the intermediate zone to the peripheral zone of said posterior surface.

15. The ophthalmic lens of claim 12, wherein the transition from the intermediate zone to the peripheral zone of said anterior surface is between the transition from the intermediate zone to the peripheral zone of said posterior surface and a peripheral edge of the lens.

16. The ophthalmic lens of claim 12, wherein the transition from the intermediate zone to the peripheral zone of said anterior surface is between the transition from the intermediate zone to the peripheral zone of said posterior surface and a peripheral edge of the lens.

* * * * *

UNITED STATES PATENT AND TRADEMARK OFFICE
CERTIFICATE OF CORRECTION

PATENT NO. : 6,520,637 B2
DATED : February 18, 2003
INVENTOR(S) : Hodur et al.

It is certified that error appears in the above-identified patent and that said Letters Patent is hereby corrected as shown below:

Column 3,
Line 27, "pre-comeal" should be -- pre-corneal --.

Column 4,
Lines 16-17, "[(cm$^3$ oxygen)(mm)/(cm$^2$)(sec)(mm Hg)]×10$^{10}$." should be -- [(cm$^3$ oxygen)(mm)/(cm$^2$)(sec)(mm Hg)]× 10$^{-10}$. --.
Line 22, "(DK = 28× 10$_{31\ 7}$)." should be -- (DK = 28× 10$^{-11}$). --.
Line 48, "$\gamma$ T" should be -- $\Upsilon_T$ --.
Lines 48, 49, 50, 51 and 52, "ΓP2" should be -- $r_{P2}$ --.
Line 48, "ΓP3" should be -- $r_{P3}$ --.
Lines 49, 50, 51 and 52, "Γbase" should be -- $r_{base}$ --.

Column 5,
Line 8, "$\gamma$T" should be -- $\Upsilon_T$ --.
Line 8, "$\gamma$P1" should be -- $\Upsilon_{P1}$ --.
Line 8, "$\gamma$P2" should be -- $\Upsilon_{P2}$ --.
Line 8, "$\gamma$A1" should be -- $\Upsilon_{A1}$ --.
Line 8, "$\gamma$A2" should be -- $\Upsilon_{A2}$ --.

Column 6,
Line 22, before "necessary" insert -- curve --.
Line 53, "(7.34 = 1.2)" should be -- (7.34 + 1.2) --.
Line 54, "(8.54 = 1.5)" should be-- (8.54 + 1.5) --.

Column 7,
Line 20, "piano" should be -- pLano --.
Line 24, "(F$v$ ='1.00)," should be -- F$v$ = -1.00), --.
Line 50, "d$_1$= 0.36" should be -- d$_1$ = 0.36 --.

UNITED STATES PATENT AND TRADEMARK OFFICE
CERTIFICATE OF CORRECTION

PATENT NO.   : 6,520,637 B2
DATED        : February 18, 2003
INVENTOR(S)  : Hodur et al.

It is certified that error appears in the above-identified patent and that said Letters Patent is hereby corrected as shown below:

Column 8,
Line 19, "computer" should be -- compute --.

Signed and Sealed this

Sixteenth Day of September, 2003

JAMES E. ROGAN
*Director of the United States Patent and Trademark Office*